(12) United States Patent
Tan et al.

(10) Patent No.: US 9,060,312 B2
(45) Date of Patent: Jun. 16, 2015

(54) WIRELESS COMMUNICATIONS METHOD AND APPARATUS

(75) Inventors: Siok Kheng Tan, Bristol (GB); Zhong Fan, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 384 days.

(21) Appl. No.: 13/511,019

(22) PCT Filed: Nov. 20, 2009

(86) PCT No.: PCT/GB2009/002713
§ 371 (c)(1),
(2), (4) Date: Aug. 15, 2012

(87) PCT Pub. No.: WO2011/061465
PCT Pub. Date: May 26, 2011

(65) Prior Publication Data
US 2012/0309356 A1    Dec. 6, 2012

(51) Int. Cl.
*H04M 1/66*     (2006.01)
*H04W 36/00*    (2009.01)
*H04W 8/00*     (2009.01)
*H04W 36/04*    (2009.01)
*H04W 84/04*    (2009.01)

(52) U.S. Cl.
CPC .......... *H04W 36/0055* (2013.01); *H04W 8/005* (2013.01); *H04W 36/04* (2013.01); *H04W 84/045* (2013.01)

(58) Field of Classification Search
CPC . H04W 36/0055; H04W 8/005; H04W 36/04; H04W 84/045; H04W 12/06; H04W 12/12; H04W 12/08; H04W 88/02; H04L 63/08
USPC ............... 455/436, 411, 435.1, 434; 704/260, 704/276, 270; 370/280, 336, 338, 281; 345/437
See application file for complete search history.

(56) References Cited

U.S. PATENT DOCUMENTS

2005/0037798 A1*  2/2005  Yamashita et al. ............ 455/525
2006/0252428 A1* 11/2006  Agashe et al. ................ 455/436
2007/0008929 A1*  1/2007  Lee et al. ...................... 370/331

(Continued)

FOREIGN PATENT DOCUMENTS

GB    2 449 231      11/2008
JP    10-93529       4/1998

OTHER PUBLICATIONS

Office Action issued Sep. 10, 2013 in Japanese Patent Application No. 2012-539396 (with English translation).

(Continued)

*Primary Examiner* — Mahendra Patel
(74) *Attorney, Agent, or Firm* — Oblon, McClelland, Maier & Neustadt, L.L.P.

(57) ABSTRACT

A Communications apparatus, suitable for establishing a wireless communications connection with a further apparatus, comprises first and second communications means. The first communications means is suitable to establish a wireless communication connection with the further apparatus and the second communications means is operable to retrieve identification information from such further apparatus. The first communications means is operable only to establish a wireless communication connection with a further apparatus on the basis of an authorization made on the basis of information retrieved from the further apparatus by the second communications means.

14 Claims, 7 Drawing Sheets

(56) References Cited

U.S. PATENT DOCUMENTS

| | | | |
|---|---|---|---|
| 2007/0202866 A1* | 8/2007 | Tsuchiya | 455/422.1 |
| 2007/0213067 A1* | 9/2007 | Li et al. | 455/444 |
| 2008/0132239 A1* | 6/2008 | Khetawat et al. | 455/438 |
| 2008/0293420 A1* | 11/2008 | Jang et al. | 455/444 |
| 2010/0120437 A1* | 5/2010 | Foster et al. | 455/444 |
| 2011/0045835 A1* | 2/2011 | Chou et al. | 455/446 |
| 2012/0040639 A1* | 2/2012 | Brisebois et al. | 455/408 |
| 2012/0129537 A1* | 5/2012 | Liu et al. | 455/444 |
| 2012/0213198 A1* | 8/2012 | Nguyen et al. | 370/331 |

OTHER PUBLICATIONS

International Search Report Issued Aug. 18, 2010 in PCT/GB09/02713 Filed Nov. 20, 2009.

* cited by examiner

WIRELESS COMMUNICATIONS METHOD AND APPARATUS

FIELD

Embodiments described herein are concerned with handover in a wireless communications networking environment. The disclosure is particularly, but not exclusively, concerned with handover in the field defined by the use of so-called "femtocells".

BACKGROUND

Recent developments in mobile and wireless communication have focused on increasing the region of network coverage of a cellular network through the effective use of bridging and relaying stations. Despite such developments, it has become evident that many locations, both in domestic and commercial situations, suffer from poor wireless network provision. This can lead to disrupted or unsuccessful communication, which can be frustrating to a user. It can also lead to reduced access to high data throughput communications protocols, which limits users' access to data communications facilities such as the Internet.

In order to address this issue, the concept of femtocells has been introduced. For clarity, it should be noted that the term "femtocell" refers to establishment of wireless communication within a relatively small region of coverage (particularly when compared with traditional cellular coverage established for mobile telephony, also known as "macrocell" coverage. Exact definitions are not forthcoming and depend on environmental and regulatory factors, but it is clear that the intention is that, whereas a macrocell might be expected to span hundreds of meters of effective, useable coverage, a femtocell would only cover a range of a few tens of meters.

Communication in a femtocell is established by means of a femtocell access point (FAP). A FAP combines fixed-line broadband access with conventional wireless communication via a cellular network. It is characterised by its low transmit power and low cost femtocell access point (FAP). A FAP will be connected for broadband access with the Internet by means of a connection to the PSTN, to a cable service or to any other fixed line access service.

Although femtocell technology is nascent, it is expected that FAPs will be easy to deploy in a home or SOHO (Small Office/Home Office) environment, for instance on a "plug and play" basis. That is, a user will not be assumed by a manufacturer of a suitable device to have significant technical knowledge. This has parallels with the use of WIFI access points nowadays—installation of a WIFI access point is generally considered to be straightforward to a user able to follow a series of simple instructions and a set up "wizard". This is not to say that a user totally unfamiliar with basic computing would find such a task straightforward—some familiarity is clearly helpful. The reader will appreciate that it is commonplace for a particular family member to be nominated as the most competent installer of computing equipment, on the basis of past experience, youth, dexterity and so on. This is not to say that another family member with less aptitude could not carry out such tasks, but that lack of familiarity is a recognised factor in contributing to unsuccessful installation.

By virtue of the fact that installation of FAPs is devolved to the home or small office user, there is no central control over location of such devices, in a macrocell. A network operator, operating base station equipment for establishing a macrocell, will have little control over the deployment of FAPs, and may need to accommodate any number (possibly in the order of hundreds) of FAPs within a location. These FAPs will inevitably not all be in optimal locations; there may be overlaps in coverage, some may be located where their own reception of the macrocell signal is somewhat compromised, and so on.

The use of a FAP to define a femtocell in a particular location is intended to provide network coverage in zones which otherwise suffer from poor or no coverage from a "macrocell" communications arrangement (for example 3G or other implementations of wireless telephony). Through provision of a FAP, a user of a suitably enabled mobile station (MS) can experience seamless communication with another network participant while that mobile user moves in or out of the resultant femtocell.

As the limit of useful coverage from a macrocell is reached (due to decreased SINR, increased likelihood of signal obstruction, and so on), a deployed FAP will provide a femtocell to which the MS's communication link can be handed over. By suitable deployment of FAPs, acceptable indoor coverage can be provided, by enabling connection of an MS to a wider network via a gateway over an existing broadband connection. A white paper by Motorola, namely "Femtocells—The Gateway to the Home", explains this in more depth.

When an MS moves into a region having coverage both from a FAP and from a macrocell cellular connection, macrocell-to-femtocell handover could be initiated by the macrocell base station (MCBS) or the FAP. In general, an MCBS maintains a neighbour list by collecting information from MSs or neighbouring BSs. The MCBS then periodically broadcasts a neighbour advertisement which informs MSs in range in the relevant macrocell as to the identity of the or each candidate MCBS in case handover to another MCBS is required. The neighbour advertisement message could include a list of neighbouring BSs and a list of FAPs. This list of FAPs may be long, such as in the order of hundreds. It would be overly time consuming or impractical for an MS to scan through the whole list of all FAPs and BSs known to the BS, particularly as the list may include some FAPs to which the MC has no access.

An efficient handover mechanism is desirable in order to ensure seamless and pervasive communication to be realised when an MS moves from one place to another. In the femtocell environment, there are three types of handover.

Firstly, femtocell-to-macrocell handover is achieved by developing a neighbour list to be held by and managed at a FAP. This neighbour list should include not only the radio characteristics of neighbouring macrocells but also their full identities. A neighbour list may include scrambling codes and channel frequencies assigned to neighbouring macrocells and femtocells. Scrambling codes are used in CDMA to separate transmissions from different access points sharing the same channel frequency.

Secondly, femtocell-to-femtocell handover can arise when an MS moves in an indoor environment with multiple FAPs. This could occur in a multi-roomed building, in which a FAP has been installed in several rooms, for example. Femtocell-to-femtocell handover can be achieved by a FAP intercepting broadcast channel information to detect the identity of a neighbouring FAP or by using some other form of centralized configuration and information distribution.

Thirdly, macrocell-to-femtocell handover must take account of the difficulty of determining unambiguously, at a macrocell BS, the identity of a target femtocell. This difficulty arises because a large number of femtocells can be overlaid with a macrocell, even in the order of magnitude of hundreds thereof. As a result, radio characteristics reported by a mobile station (MS) may be insufficient to enable choice of a handoff target. To facilitate handoff, an MS has to determine a nearby macrocell BS or FAP from the neighbour list provided by the macrocell BS currently serving the connection with the MS.

In a conventional handover process, an MS first selects a scrambling code of a nearby access point from the neighbour list received from its current serving access point. The MS then make use of the scrambling code to decode a pilot signal which is repeatedly transmitted by the nearby access point, in order to determine the communication channel quality such as signal-to-noise ratio, or carrier to interference and noise ratio (CINR).

If the MS is satisfied with the channel quality, then it establishes a connection with the access point. Otherwise, the MS selects a different scrambling code from the neighbour list for a different access point and repeats the same process until a suitable access point has been found. Therefore, the scrambling code should be uniquely associated with one access point so that it can be uniquely identified.

However, based on the existing standards, the neighbour list length is limited. For example, in UMTS, only a maximum of 32 scrambling codes can be accommodated. Therefore, if a macrocell BS holds a neighbour list of all FAPs within its scope of communication, it is likely (given that hundreds of such FAPs may have been deployed in such a macrocell) that the scrambling code of a FAP will not be unique.

Accordingly, handover to the correct FAP might not be achieved, as any particular scrambling code may be shared by two or more FAPs. An attempt to handover to a nearby FAP which has not been authorised for use can also arise, resulting in "handover interference". Handover interference wastes radio resources as well as the battery lifetime of the MS and hence it is undesirable.

US Patent Application US2009061892A1 suggests that handover to a femtocell can be facilitated by location information held by an MS, determined by using triangulation methods with regard to a macrocell base station or FAP. The MS can then compare the current location to stored location information of one or more femtocells to determine if one or more of the femtocells is in proximity to the MS. This is followed by scanning for the identified FAP or FAPs and connection thereto.

In that document, it is assumed that the location of the FAP is known. However, in practice, it is difficult to pinpoint the location of the FAP using existing GPS methods (such as exemplified by European Patent Application EP2051547A1). Such methods have a tendency not to be successful, particularly as GPS based location determinations can suffer due to poor signal quality in indoor environments.

International Patent Application WO2009058108A1 proposes the use of a "home profile" setting for an MS. This setting is created when a user installs FAPs. When the MS communicates with a FAP identified in the home profile, the MS adapts a neighbour listing provided by the home FAP. This simplifies the handover process as the MS has only a limited number of neighbours on the neighbour list to consider.

SUMMARY

Embodiments described herein take advantage of the simplicity of RFID technology to facilitate handover from a Macro BS to a FAP and to avoid occurrence of handover interference.

Embodiments described herein provide a simple and efficient method of facilitating macrocell-to-femtocell handover by using integration of RFID technology with femtocell technology. Firstly, a RFID detection method is used to detect an authorized MS user within range, and RFID distance estimation is used to facilitate handover candidate determination. This method can provide distance information (FAPs to MS) in an indoor environment when there are multiple FAPs in the area based on the RSSI information readily observed in the RFID integrated FAP environment.

RFID technology has been used in a wide range of industries such as retail, supply chain, logistics, and pharmaceutical due to its low cost and increased capability. Passive RFID tags are inexpensive and lightweight, and such tags are widely used, particularly relative to active RFID tags.

In this disclosure, embodiments described herein provides an RFID integrated FAP which can
- Detect the presence of an MS by detecting an RFID tag integrated therewith;
- Determine if the MS is an authorised user by checking the RFID tag ID against a list;
- Collect RSSI reading (readily available) when the RFID tag ID is read; and/or
- Coordinate with the leader FAP (selected beforehand) to determine the N (closest distance) handover candidates in a multiple FAP scenario.

A multi antenna RFID reader is operable to energise an antenna, in response to which RFID tags within range are activated and respond with identification information and possibly other data.

DESCRIPTIONS OF DRAWINGS

Specific embodiments will now be described with reference to the accompanying drawings, in which.

DESCRIPTION OF SPECIFIC EMBODIMENTS

Two embodiments will now be described. In a first embodiment, a single FAP is implemented in a particular region, and in a second embodiment a plurality of FAPs are implemented in a particular region.

Figure 1:
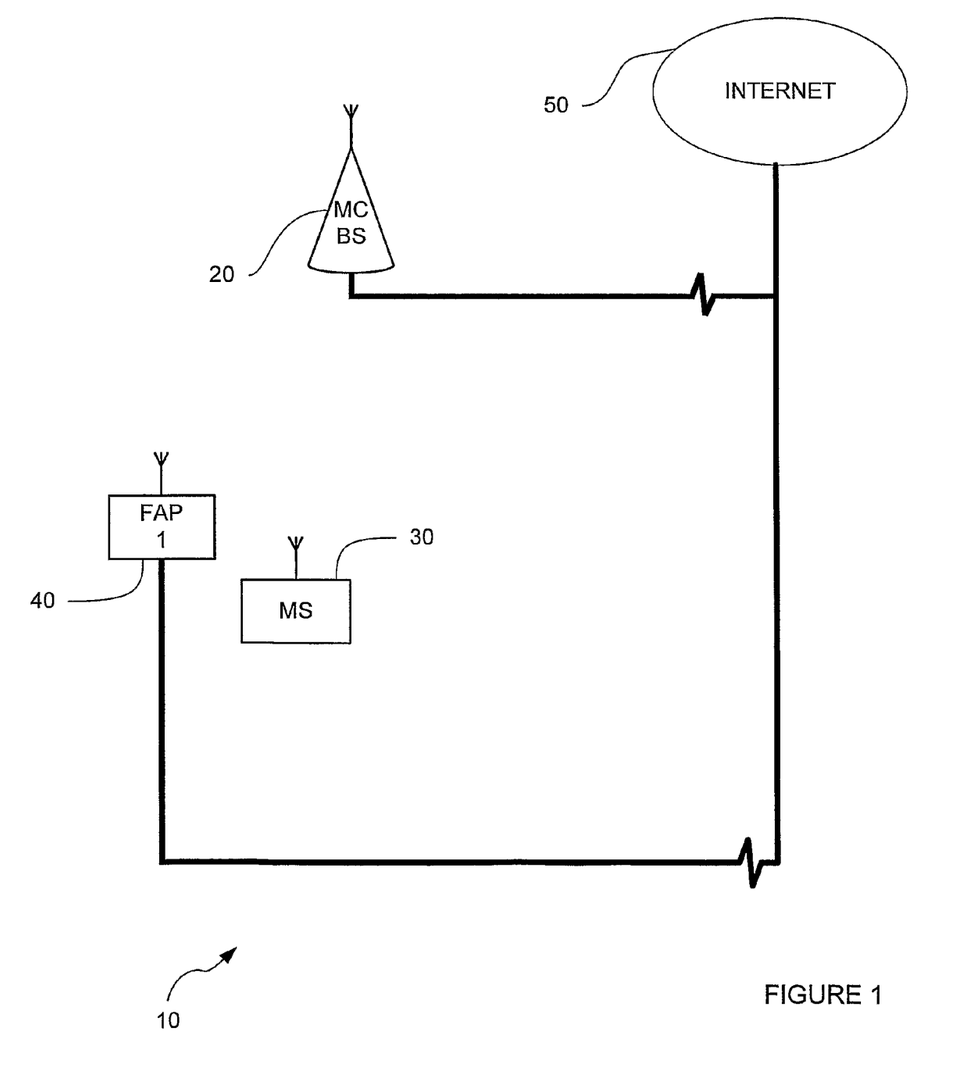
FIG. 1 illustrates a schematic diagram of a communications network in accordance with a first embodiment, incorporating a base station for defining a macrocell, and a femtocell access point, and a mobile station situated therein.

Referring firstly to FIG. 1, a schematic diagram of a typical communications network is illustrated. A mobile telephony mast is represented by a macrocell base station (MCBS) 20 of typical design and capable of establishing telecommunications connection with a mobile station 30. The typical range of operable signal strength, for bidirectional communication about the MCBS 20 is hereinafter referred to as a macrocell. In general, but not illustrated here, a plurality of MCBSs 20 are provided, positioned relative to each other to provide cellular wireless communications coverage over a wide area. In most cases, a cellular network is carefully designed, on the basis of survey and other information, and each MCBS 20 is positioned with regard to that information to ensure that the average coverage of macrocells is maximised.

The particular standard of technology employed for this telecommunications connection is of no concern to the present disclosure but, for this example, CDMA is employed. It will be appreciated that the disclosure has applicability in many types of technology, such as GSM, LTE, UMTS and so on.

A femtocell access point (FAP) 40 is provided. As illustrated, this is capable of establishing wireless communication within a relatively small range, typically in the order of magnitude of a few meters. This range is commonly known as a "femtocell", analogous to the term "macrocell" previously discussed.

The MCBS 20 and the FAP 40 are each connected to internet resources 50, by means of a variety of physical connection media. In the case of the MCBS 20, this will comprise of the conventional "backhaul", which provides connectivity between the MCBS 20 as illustrated and other communications facilities such as macrocell base stations, the PSTN, information services such as provided via the internet.

It will be noted by the reader that illustration of a single entity label "the Internet" 50 is inaccurate and schematic, but acts as a convenient illustration of the connectivity of components with an information resource.

The FAP 40 will be connected to information resources such as the Internet 50 and to communications resources such as the PSTN, by means of a physical connection such as would normally be provided in a domestic or small or home office environment. Such connectivity is provided often by means of a direct telephonic connection to the PSTN, or by cable and/or Internet services provided by separate service provider. It is also conceivable that, in certain remote locations, satellite technology, or application specific radio communications, could be used to obviate the need for hardwired connections to a particular premises. For instance, a microwave link might be provided between a specific premises and another base station, on a fairly permanent basis, in order to provide the foundation for telecommunication.

A mobile station (MS) 30 is illustrated in the diagram of FIG. 1. As shown, the mobile station 30 is intended to be represented as being relatively local to the FAP 40, but still within range of the MOBS 20. As such, in order to establish communication from the MS 30, a choice of communication methods are available.

In this example, the MS 30 can be exemplified by a mobile telephone, or other handheld communications device.

Figure 2:
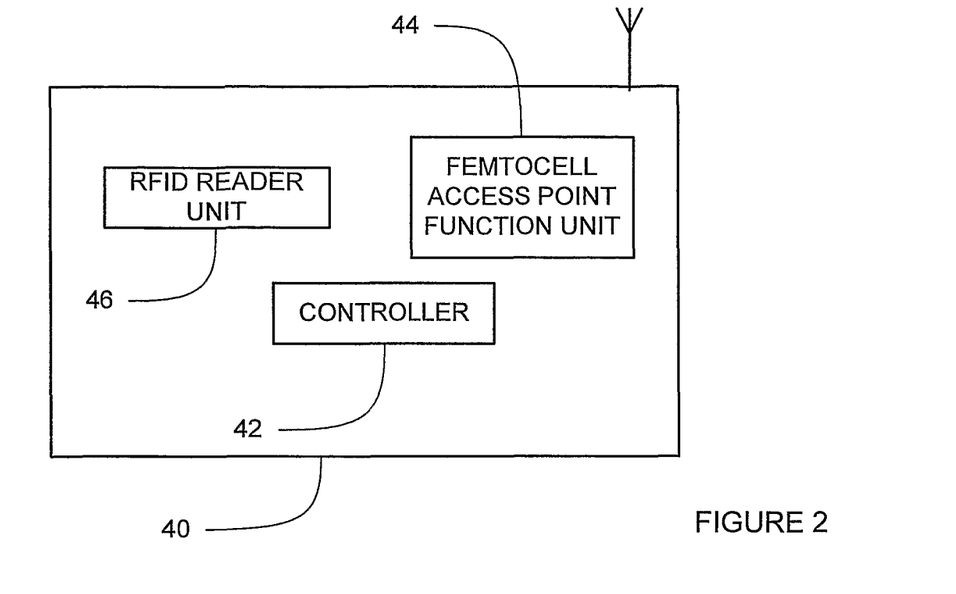
FIG. 2 illustrates the femtocell access point of FIG. 1 in further schematic detail.

With reference to FIG. 2, the FAP 40 comprises a controller 42, a functional unit labelled as a "femtocell access point function unit" 44 operable to provide communications functionality for use of the device as an FAP, and an RFID reader unit 46. The RFID reader unit 46 may be of conventional construction and could be provided as commercial off-the-shelf (COTS) technology.

Figure 3:
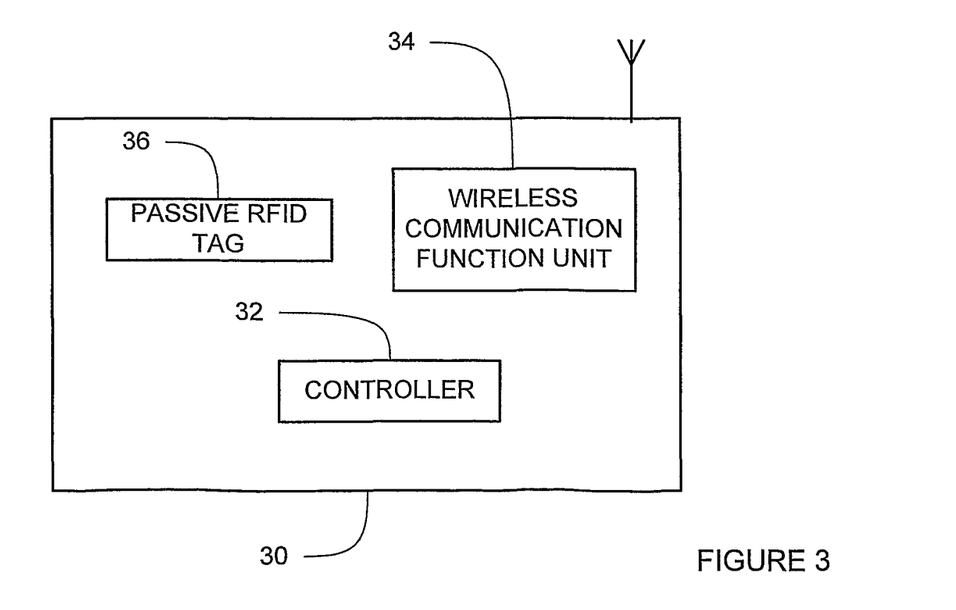
FIG. 3 illustrates the mobile station of FIG. 1 in further schematic detail.

Similarly, a mobile station (MS) 30 for use in the context of the present embodiment is illustrated in FIG. 3. This comprises a controller 32, a wireless communication function unit 34 and a passive RFID tag 36. Since the RFID tag 36 is passive, it need not be integrated into the device itself. It could be provided as a separate unit, such as on an adhesive label, which could then be affixed to the outside body of the mobile station 30.

In use, when the MS 30 moves into the coverage of the FAP 40, with a connection to the MCBS 20 already established, macrocell to femtocell handover can be initiated. It is advantageous to initiate such handover as soon as a femtocell becomes available for use, because communication with a femtocell is likely to require less power consumption at the mobile station than with the macrocell base station 20. Moreover, provision of macrocell services can be technically complex and can also have capacity and power consumption issues and so there is an incentive to the provider of macrocell services that configurations which reduce usage of macrocells be encouraged.

It could be noted here that the present disclosure makes no specific proposals regarding arrangements for commercial compensation of the various parties who will provide services to enable the illustrated arrangement to arise. For instance, it may well be in the interests of a network provider (operating a macrocell) to market devices in accordance with the FAP 40. This will increase coverage of their network while reducing direct usage of network macrocell equipment. It may also, indirectly, encourage use of handsets and use of information services provided by the macrocell network provider.

However, the macrocell network provider will, by providing FAPs, reduce traffic of data on its network. Instead, such data will be communicated by means of the "backhaul" as illustrated in FIG. 1. The provider of backhaul services may well be different from the macrocell network provider. The backhaul service provider may require compensation from the mobile telephony service provider in order to allow this arrangement to exist. Otherwise, guaranteed quality of service standards to allow voice and data communication via femtocells may not be provided by an internet service provider, and overuse of backhaul services may contravene terms of use governed by the internet service provider.

In order to establish macrocell to femtocell handover, either the MOBS 20 or the FAP 40 can initiate the process. In general, an MOBS 20 maintains a neighbour list by collecting information from mobile stations or neighbouring base stations. The MCBS 20 then periodically broadcasts a neighbour advertisement informing mobile stations or candidate base stations in case handover is required. In the context of the additional provision of femtocells to the wireless communications environment, neighbour advertisement can include neighbour base stations and a long list of FAPs. It will be appreciated that it would be overly time consuming or impractical for a mobile station to scan through all FAPs in the list, particularly as the number of FAPs available could be in the order of hundreds or more. In particular, although a base station may be in communication with many FAPS in its range, very few of these will be available to any particular mobile station, because of the relative transmission powers of such devices.

Figure 4:
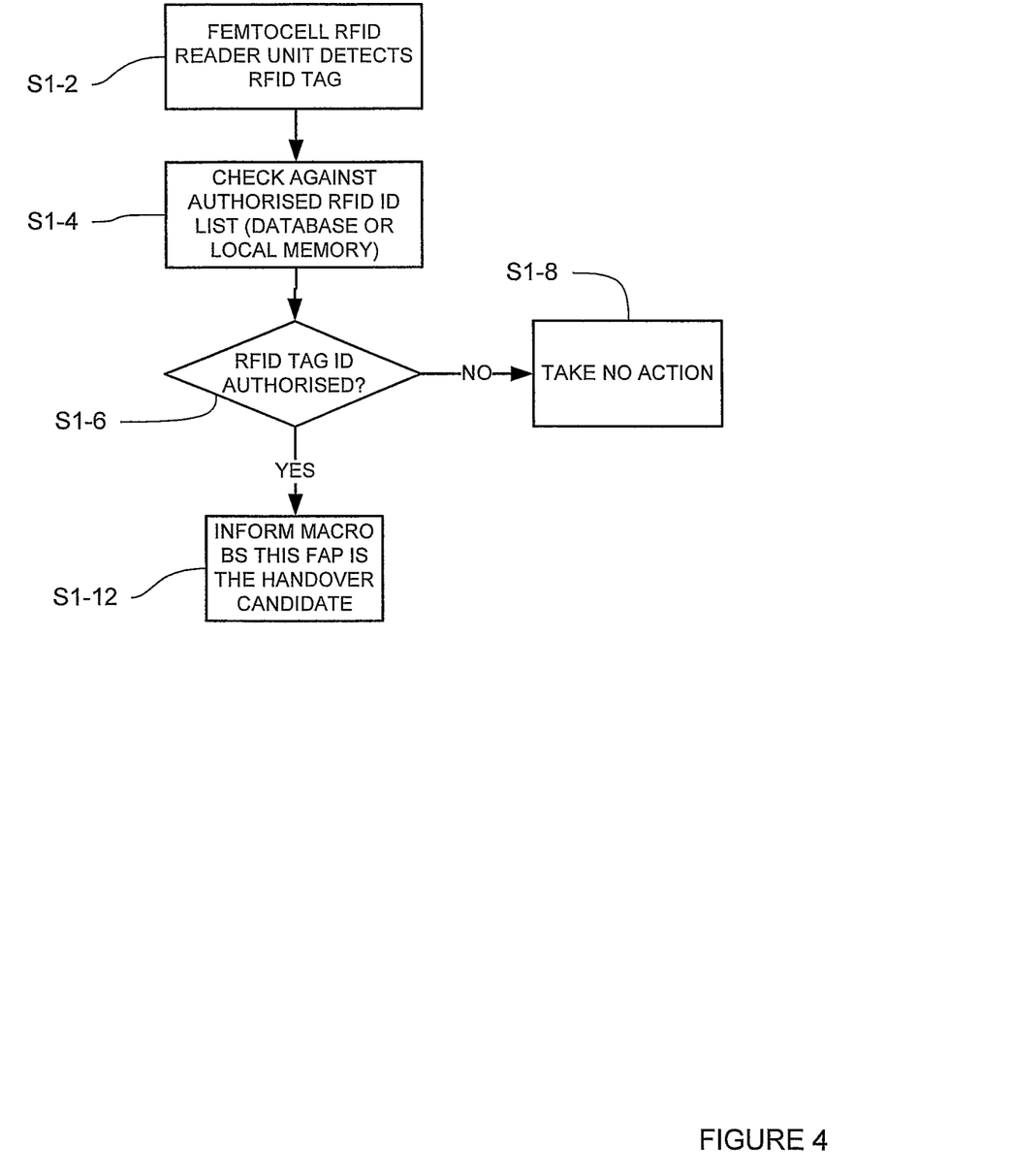
FIG. 4 illustrates a flow diagram of operation of a handover method at the femtocell access point for the first embodiment of the invention.

As illustrated in FIG. 4, when a mobile station with an attached RFID tag enters the region observed by the FAP 40 (with an integrated RFID reader as shown in FIG. 2), the FAP RFID reader unit 44 detects the RFID tag on the MS 30 (step S1-2). This clearly assumes that the RFID reader unit 44 is capable of reading the RFID tag of the MS 30. This assumption can be made to the extent that the RFID reader can be adjusted to have a read range substantially the same as the femtocell range.

Then, information held in the RFID tag is captured by the RFID reader unit 46. This information is checked against a list of authorised RFID identification data in step S1-4. This list may be held in a database external of the FAP, or may alternatively be stored in local memory. The list defines those MSs which are granted permission to use the femtocell established by the FAP 40.

In step S1-6, the FAP 40 determines whether the RFID tag ID is authorised, i.e. whether it is on the list of authorised RFID tags. If not, then no action is taken (step S1-8). It is not necessary to offer a failure message to the MS, although it might be useful to inform the MS that the femtocell exists but is not available for use by that MS. In that way, the user of the MS might be encouraged to take steps (which might involve taking a subscription or otherwise paying for access) which led to authorisation being granted.

Alternatively, in a multiple FAP scenario (as per the second embodiment), the RSSI information is measured from the RFID tag and collected from other FAPs in the group, to be appended to a potential FAP list.

Figure 5:
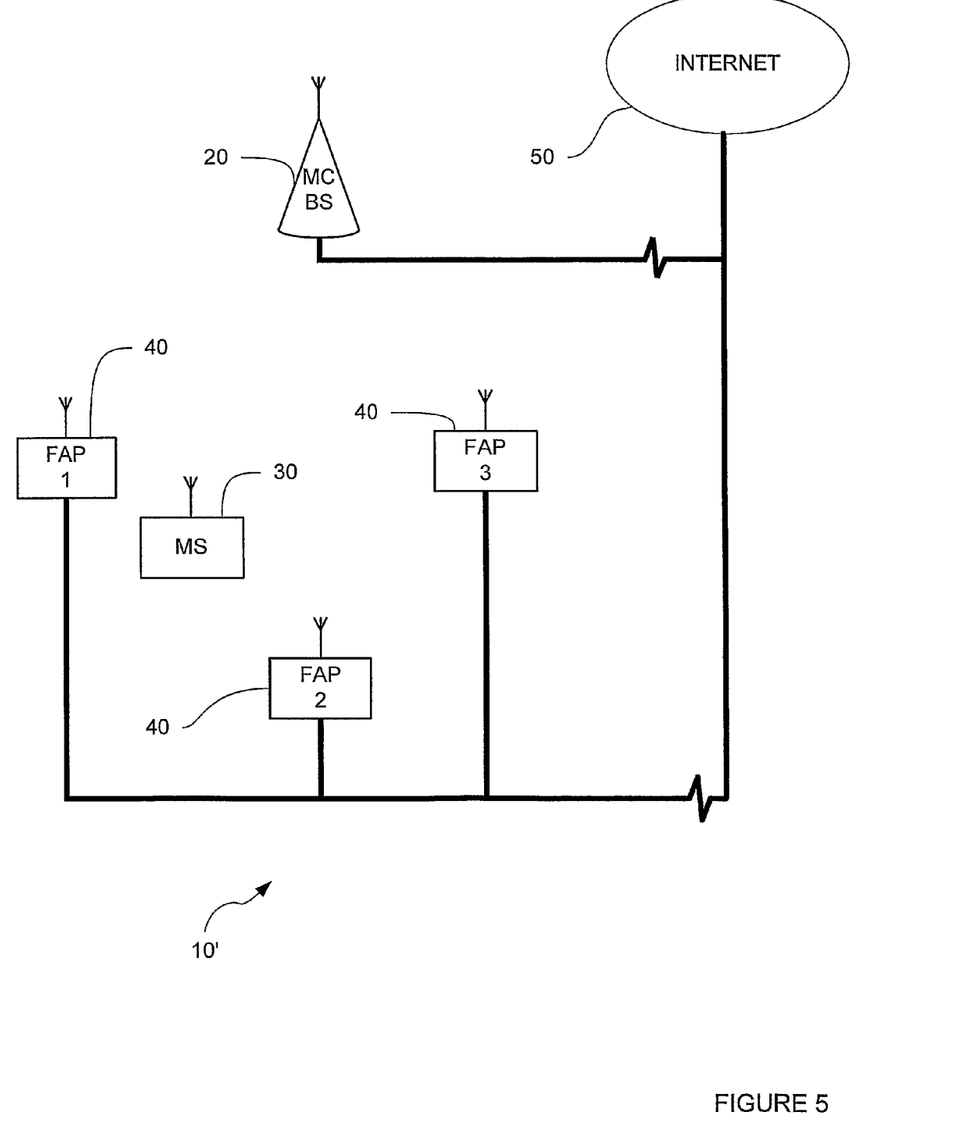
FIG. 5 illustrates a schematic diagram of a communications network in accordance with a second embodiment of the invention, incorporating a base station for defining a macrocell, and a plurality of femtocell access points, and a mobile station situated therein.

As shown in FIG. 5, a second embodiment provides a multiple FAP scenario. In this embodiment, a communication system 10' comprises several FAPs 40. As shown, it also includes the other components previously described with reference to the first embodiment.

The second embodiment illustrates a situation whereby a user has installed several FAPs in a location, which might arise particularly in the event that a domestic environment has many rooms, potentially with internal walls which are not particularly permeable to radio transmission. To provide full coverage, a user may feel that more than one FAP may be required.

It should be noted that this installation of several FAPs in a particular location may be done more on the basis of instinct or "gut feeling" rather than technical survey. A user may find that, on the basis of installing a single FAP, more FAPs are required in order to provide full femtocell coverage over a house or office. However, installation of additional FAPs may be done on the basis of trial and error rather than signal strength data and meticulous network design. Thus, some areas of a location may be covered by several femtocells and, conceivably, other areas by one or no femtocells.

In this set of circumstances, the FAPs need to form a group and one of these FAPs needs to be designated the leader. The FAPs are said to belong to a closed FAP group (CFG) which is available for use by a group of authorised MS. This may be commonplace in, for instance, enterprise office buildings or densely residential areas served by a common service provider.

In such a case, a "leader FAP" can be designated beforehand, to coordinate among FAPs in a CFG. This can be achieved in a number of ways, for example by choosing, as leader FAP, the FAP with the smallest MAC ID. The reader will appreciate that, for the purpose of this example, the present embodiment is for use in a CFG or an OSG environment.

A number of FAPs with the same leader will be in range with the leader FAP and will cooperate with the leader FAP in terms of deciding who the candidates for handover are with respect to the detected authorised MS.

Figure 6:
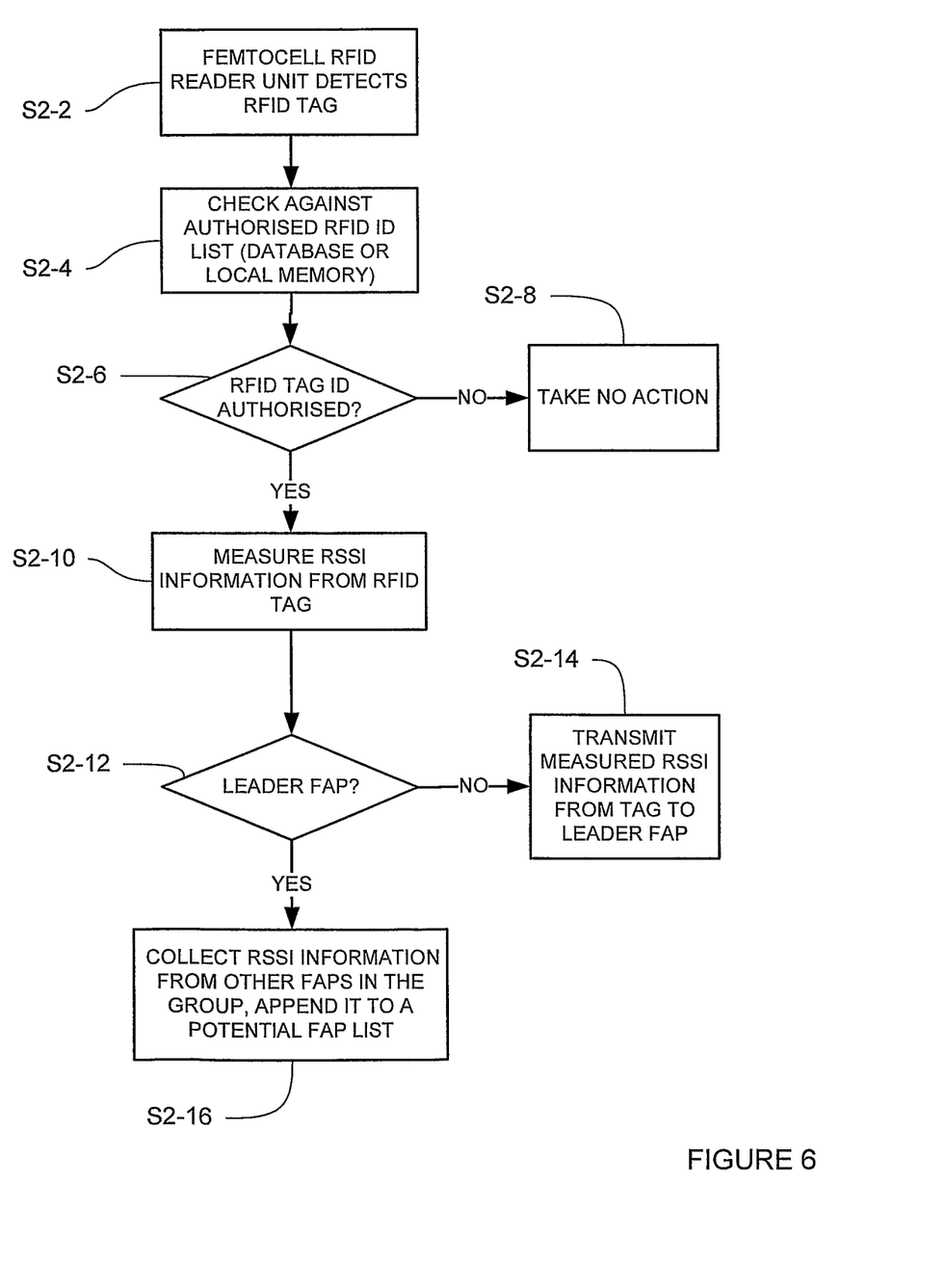
FIG. 6 illustrates a flow diagram of a method performed at a FAP in the communications network illustrated in FIG. 5, to construct a handover candidate FAP list.

Again, an authorisation process is required, and this is carried out at any FAP encountering an MS in the network, in accordance with the flow diagram in FIG. 6.

The process is initiated (in step S2-2) by the detection of the RFID tag of an MS. This RFID tag is checked, in step S2-4, against a list of authorised RFID IDs, held locally or in a database accessible to the FAP.

If, in step S2-6, it is determined that the MS is not authorised, then in step S2-8 the process ends with no further action. As before, a connection refusal message could be sent back to the MS, but this is not essential.

Otherwise, in step S2-10, the FAP measures the RSSI information from the RFID tag. In step S2-12, it then checks whether it is the leader FAP. If it is not, then in step S2-14 it transmits the measured RSSI information from the tag to the leader FAP.

If the FAP is the leader FAP, then in step S2-16 it collects corresponding RSSI information from other FAPs in the group, and assembles a "potential FAP list".

Figure 7:
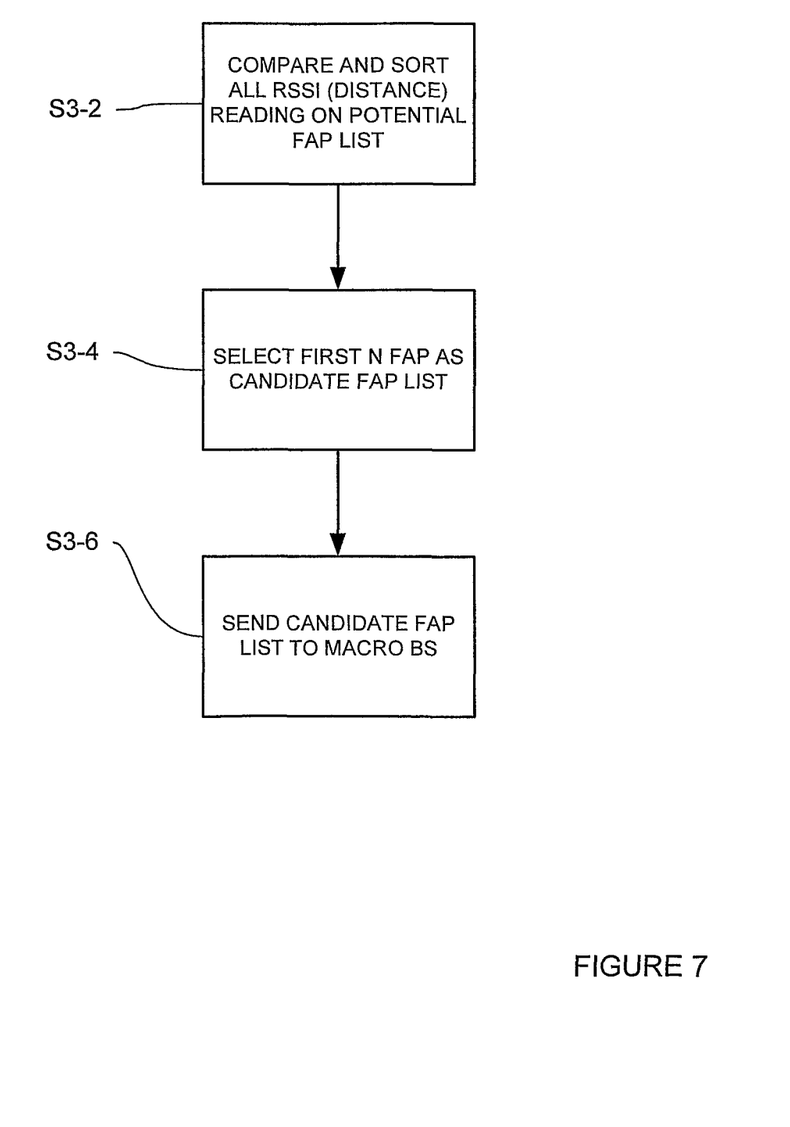
FIG. 7 illustrates a flow diagram of a method performed at a leader FAP in the communications network illustrated in FIG. 5, to finalize and send a handover candidate FAP list.

This "potential FAP list" is used in the second embodiment to determine a handover FAP list, as illustrated in FIG. 7.

In this embodiment, there is a need to determine which of a group of FAPs is the most appropriate candidate to which to hand over. In this case, the RFID reader integrated into each FAP is able to gather RSSI information through passive communication with the RFID tag on the MS. With multiple readings from different RFID readers, collected at the predetermined leader FAP, a potential handover FAP list is developed. This will provide an estimate of the distance between the MS and the FAPs, and the closest FAP to the MS can be determined. The leader FAP will then provide the MOBS with a handover candidate FAP list. In FIG. 7, in step S3-2, the RSSI readings for a given MS at each FAP are assembled at the leader FAP, and compared and sorted. Then, in step S3-4, the first N FAPs so identified (i.e. the strongest readings) are selected, based on these distance estimation results.

In this embodiment, N is a number much smaller than the potentially hundreds of FAPs within range of the macrocell Base Station, the full list of which would form the basis for a conventional handover method.

Figure 8:
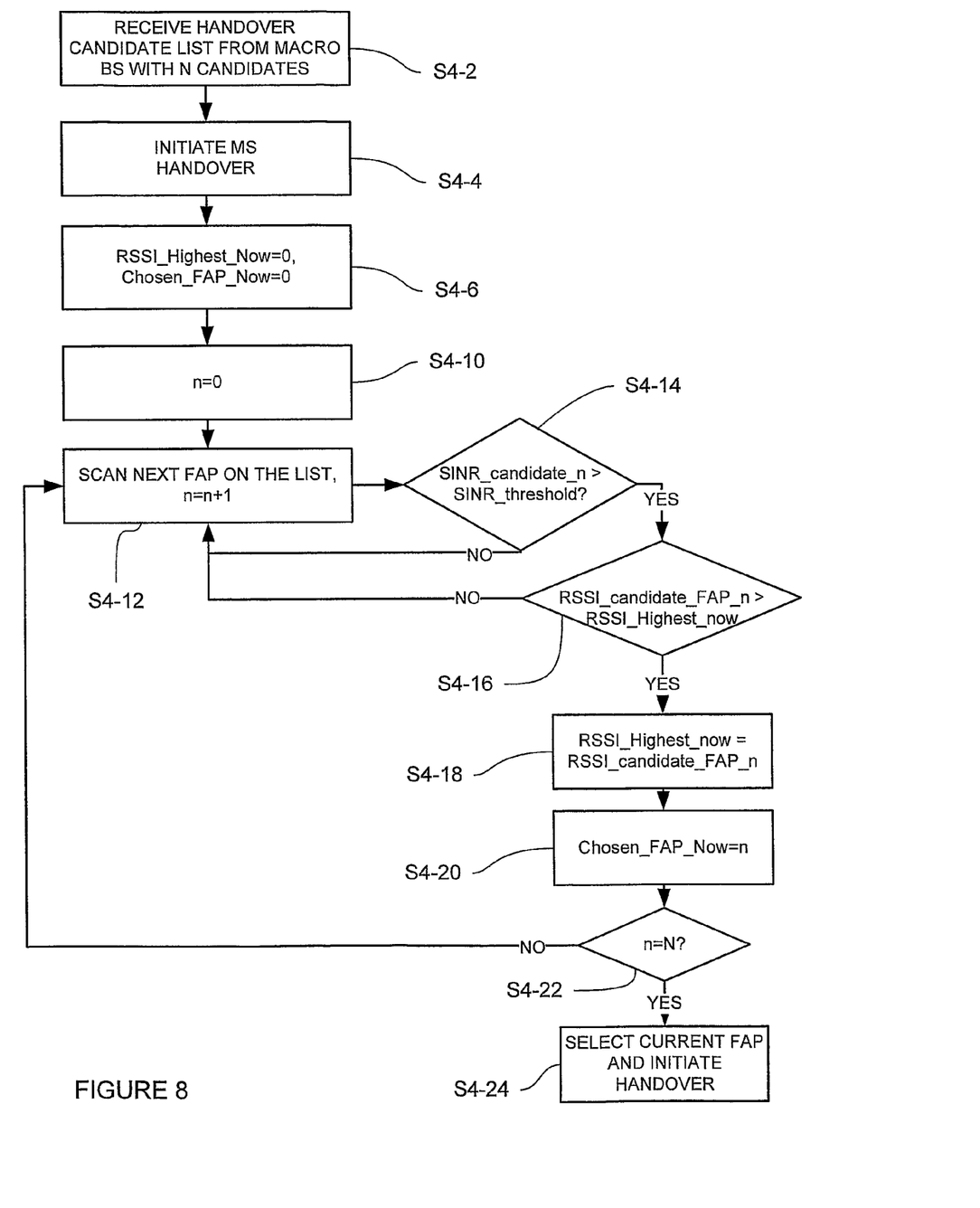
FIG. 8 illustrates a flow diagram of operation of a handover method at a Base Station in accordance with the second embodiment of the invention.

In step S3-6, the list of N FAPs is sent to the MCBS 20. On receipt of a list of N FAPs as described, the MCBS 20 will perform a FAP selection method such as illustrated in FIG. 8, commencing with step S4-2.

In step S4-4, MS handover is initiated. In step S4-6, two quantities are initialised to zero, namely RSSI_Highest_Now (representing the highest encountered RSSI reading since the start of the process) and Chosen_FAP_Now (being the current FAP selection as the process is ongoing). A count "n" is also initialised to zero (step S4-10).

Then, in step S4-12, the next FAP on the received list is scanned, by incrementing n.

In step S4-14, the SINR of the candidate FAP is checked against an SINR threshold. If the FAP under consideration has an insufficiently good signal quality, then the process returns to step S4-12.

Otherwise, the RSSI of the candidate FAP is then, in step S4-16, compared with the quantity RSSI_Highest_Now. If the RSSI is lower than the highest RSSI encountered so far, then, again, the FAP under consideration is rejected and the process continues again from step S4-12.

If the FAP continues to be under consideration, then the quantity RSSI_Highest_Now is updated to be the RSSI reading of the FAP under consideration (Step S4-18). This FAP is then considered to be the provisional selection, and so Chosen_FAP_Now is updated to reflect this in step S4-20.

In step S4-22, a check is made as to whether the FAP under consideration is the last to be checked. If not, then the next FAP is considered in step S4-12. Otherwise, the FAP indicated in the quantity Chosen_FAP_Now is selected in S4-24 and handover to that FAP is initiated.

As the above processes are performed on a per MS basis, they are suitable for use in an environment in which there are several MSs (some authorised for use with the FAPs in question, while others may not be) without causing handover interference. The processes also have the potential to reduce the time taken, and energy expended, by having a BS scan the most relevant FAP in terms of distance and authorisation.

The described embodiments provide a method suitable for macro BS to FAP handover. It will be appreciated that the described arrangement is predicated on a suitably configured FAP (with integrated RFID reader) having adequate read range to be able to detect the presence of an RFID tags on a MS. Since RFID readers already exist with read range in the order of a few meters, this condition can readily be satisfied.

Although the described examples are presented in connection with a CDMA system, it will be appreciated the disclosure can be generalized for use in all types of technology such as GSM/LTE/UMTS etc.

The invention claimed is:

1. A communications apparatus, suitable for establishing a wireless communications connection with a further apparatus, and comprising:
   a first communication unit operable to establish a wireless communication connection with said further apparatus;
   a second communications unit operable to retrieve identification information from said further apparatus; and
   an authorization unit operable to determine, on the basis of the retrieved identification information, whether the further apparatus is authorized;
   wherein said first communications unit is operable to establish a wireless communication connection with said further apparatus, dependent on the further apparatus being authorized,
   said second communications unit is operable to measure, with said retrieved identification information, signal strength of a signal bearing said retrieved identification information, and
   wherein said communications apparatus is operable to collect information gathered at other communications apparatus from a further apparatus and, on the basis of said gathered information, to send handover information to a communications station, the handover information defining a subset of the other communications apparatus suitable for connection with the further apparatus.

2. A communications apparatus in accordance with claim 1 and further comprising a third communications unit operable to establish a connection with a third party data resource.

3. A communications apparatus in accordance with claim 2 wherein said third communications unit is operable to connect to a physical communications medium, for provision of a connection to the Internet.

4. A communications apparatus in accordance with claim 1 wherein said second communications unit comprises a radio frequency identification receiver, operable to communicate with a radio frequency identification tag of a further apparatus.

5. A communications apparatus in accordance with claim 1 wherein said second communications unit is operable to measure, with said retrieved identification information, signal strength of a signal bearing said retrieved identification information.

6. A communications network comprising a first base station and a second base station,
   the first base station comprising,
   a first wireless communications unit suitable to establish a wireless communication connection with a mobile station within a range; and
   the second base station comprising,
   a communications apparatus suitable to establish a wireless communication connection with a mobile station within a range, and comprising,
   a first communications unit operable to establish a wireless communication connection with said mobile station,
   a second communications unit operable to retrieve identification information from said mobile station, and
   an authorisation unit operable to determine, on the basis of the retrieved identification information, whether the mobile station is authorized;
   wherein said first communications unit is operable to establish a wireless communication connection with said mobile station, dependent on the further apparatus being authorized,
   wherein the range of the first base station is substantially larger than the range of the second base station,
   said second communications unit is operable to measure, with said retrieved identification information, signal strength of a signal bearing said retrieved identification information, and
   wherein said second base station is operable to collect information gathered at other second base stations from a mobile station and, on the basis of said gathered information, to send handover information to said first base station, the handover information defining a subset of the second base stations suitable for connection with the mobile station, said first base station being operable to determine, on the basis of the received handover information, one of said second base stations suitable for connection with the mobile station, and to initiate handover from said first base station to said determined second base station.

7. A communications network comprising a first base station and a plurality of second base stations,
   the first base station comprising:
   a first wireless communications unit suitable to establish a wireless communication connection with a mobile station within a range, and
   each of said second base stations comprising:
   a communications apparatus, suitable to establish a wireless communication connection with a mobile station within a range, and comprising,
   a first communications unit operable to establish a wireless communication connection with said mobile station,
   a second communications unit operable to retrieve identification information from said mobile station, and
   an authorisation unit operable to determine, on the basis of the retrieved identification information, whether the mobile station is authorized;
   wherein said first communications unit is operable to establish a wireless communication connection with said mobile station, dependent on the further apparatus being authorized,
   wherein the range of the first base station is substantially larger than the range of each second base station,
   said second communications unit is operable to measure, with said retrieved identification information, signal strength of a signal bearing said retrieved identification information, and
   wherein one of said second base stations is operable to collect information gathered at said other second base stations from a mobile station and, on the basis of said gathered information, to send handover information to said first base station, the handover information defining a subset of the second base stations suitable for connection with the mobile station, said first base station being operable to determine, on the basis of the received handover information, one of said second base stations suitable for connection with the mobile station, and to initiate handover from said first base station to said determined second base station.

8. A communications network in accordance with claim 7 wherein one of said second base stations is operable to collect identification information gathered at said other second base stations from a mobile station and, on the basis of said gathered identification information, to send handover information to said first base station.

9. In a communications network comprising first and second communications apparatus, wherein the first communications apparatus comprises first and second communications units, said first communications unit being suitable to establish a wireless communication connection with said second apparatus and said second communications unit being operable to retrieve identification information from such second apparatus, a method of establishing a wireless communications connection between said first and second communications apparatus, the method comprising:

seeking, from the first apparatus, information from said second apparatus via said second communication unit, performing an authorisation check on the basis of received information, and establishing a wireless communication connection with said second apparatus only on authorisation of said second apparatus in said authorisation check, measuring, by said second communications unit, with said retrieved identification information, signal strength of a signal bearing said retrieved identification information, and collecting, by said communications apparatus, information gathered at other communications apparatus from a further apparatus and, on the basis of said gathered information, to send handover information to a communications station, the handover information defining a subset of the other communications apparatus suitable for connection with the further apparatus.

10. A method in accordance with claim 9, further comprising establishing a connection between said first apparatus and a third party data resource by way of a third communications unit of the first communications apparatus.

11. A method in accordance with claim 10 comprising using the third communications unit to connect to a physical communications medium, for provision of a connection to the Internet.

12. A method in accordance with claim 9, comprising providing the second communications unit with a radio frequency identification receiver, and using said second communications unit to communicate with an radio frequency identification tag of a second apparatus.

13. A method in accordance with claim 9, and including measuring, with said second communications unit, signal strength of a signal bearing said retrieved information.

14. A non-transitory computer program product comprising computer executable instructions which, when executed by a computer controlled communications device, cause the device to perform a method in accordance with claim 9.

* * * * *